United States Patent
Osawa

(10) Patent No.: US 11,290,965 B2
(45) Date of Patent: Mar. 29, 2022

(54) USER TERMINAL AND RADIO COMMUNICATION METHOD

(71) Applicant: NTT DOCOMO, INC., Tokyo (JP)

(72) Inventor: Ryosuke Osawa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/762,368

(22) PCT Filed: Nov. 9, 2017

(86) PCT No.: PCT/JP2017/040465
§ 371 (c)(1),
(2) Date: May 7, 2020

(87) PCT Pub. No.: WO2019/092835
PCT Pub. Date: May 16, 2019

(65) Prior Publication Data
US 2020/0359338 A1    Nov. 12, 2020

(51) Int. Cl.
*H04W 52/34* (2009.01)
*H04W 52/18* (2009.01)
*H04W 72/04* (2009.01)

(52) U.S. Cl.
CPC .......... *H04W 52/34* (2013.01); *H04W 52/18* (2013.01); *H04W 72/0473* (2013.01)

(58) Field of Classification Search
CPC .. H04W 52/34; H04W 52/18; H04W 72/0473
USPC ........................................................ 455/522
See application file for complete search history.

(56) References Cited

U.S. PATENT DOCUMENTS

| 6,259,685 B1 | 7/2001 | Rinne et al. |
| 7,263,132 B2 * | 8/2007 | Horng ................. H04B 7/0417 375/267 |
| 8,260,207 B2 * | 9/2012 | Srinivasan ............ H04W 52/40 455/63.1 |

(Continued)

FOREIGN PATENT DOCUMENTS

| JP | 2014-512737 A | 5/2014 |
| WO | 9844754 A2 | 10/1998 |
| WO | 2017135573 A1 | 8/2017 |

OTHER PUBLICATIONS

International Search Report issued in PCT/JP2017/040465 dated Jan. 30, 2018 (2 pages).

(Continued)

*Primary Examiner* — Hai V Nguyen
(74) *Attorney, Agent, or Firm* — Osha Bergman Watanabe & Burton LLP

(57) ABSTRACT

A user terminal according to one aspect of the present disclosure includes: a transmitting section that performs transmission by using a plurality of Radio Access Technologies (RATs); a receiving section that receives allocation configuration information including a plurality of pieces of information each related to an allocation of maximum transmission power for each of the plurality of RATs; and a control section that determines an allocation of maximum transmission power of each of the plurality of RATs from a plurality of allocations, based on the allocation configuration information. According to one aspect of the present disclosure, reduction of throughput and so on can be prevented even when a plurality of RATs are used.

4 Claims, 8 Drawing Sheets

(56) References Cited

U.S. PATENT DOCUMENTS

| | | | | |
|---|---|---|---|---|
| 8,391,796 | B2* | 3/2013 | Srinivasan | H04W 16/08 455/63.1 |
| 8,412,103 | B2* | 4/2013 | Srinivasan | H04W 52/40 455/63.1 |
| 8,442,564 | B2* | 5/2013 | Love | H04W 72/1215 455/501 |
| 8,781,437 | B2* | 7/2014 | Ngai | H04W 52/38 455/404.1 |
| 8,804,568 | B2* | 8/2014 | Borran | H04B 17/309 370/252 |
| 8,868,122 | B2* | 10/2014 | Taoka | H04L 5/0028 455/522 |
| 8,891,654 | B2* | 11/2014 | Kang | H04B 7/0417 375/267 |
| 8,909,282 | B2* | 12/2014 | Ngai | H04W 52/365 455/522 |
| 8,995,938 | B2* | 3/2015 | Ali | H04B 1/3838 455/127.1 |
| 9,042,926 | B2* | 5/2015 | Xiao | H04W 52/40 455/507 |
| 9,042,936 | B2* | 5/2015 | Chiou | H04W 52/367 455/522 |
| 9,054,780 | B2* | 6/2015 | Wilson | H04B 1/04 |
| 9,107,169 | B2* | 8/2015 | Kwun | H04W 52/38 |
| 9,363,780 | B2* | 6/2016 | Yang | H04L 5/0073 |
| 9,674,792 | B2* | 6/2017 | Hu | H04L 1/0003 |
| 9,785,174 | B2* | 10/2017 | Khawand | G05F 3/02 |
| 9,813,997 | B2* | 11/2017 | Mercer | H04B 17/10 |
| 9,866,364 | B2* | 1/2018 | Jia | H04L 5/12 |
| 9,871,544 | B2* | 1/2018 | Mercer | H04W 52/04 |
| 9,955,430 | B2* | 4/2018 | Shao | H04W 52/04 |
| 10,013,038 | B2* | 7/2018 | Mercer | G06F 1/1654 |
| 10,014,976 | B2* | 7/2018 | Kim | H04B 7/0413 |
| 10,187,180 | B2* | 1/2019 | Sorrentino | H04L 1/18 |
| 10,224,974 | B2* | 3/2019 | Mercer | H04W 52/18 |
| 10,291,309 | B2* | 5/2019 | Chakraborty | H04W 52/146 |
| 10,314,035 | B2* | 6/2019 | Su | H04W 52/0251 |
| 10,425,900 | B2* | 9/2019 | Liu | H04W 52/241 |
| 10,432,287 | B2* | 10/2019 | Park | H04B 7/04 |
| 10,440,701 | B2* | 10/2019 | He | H04W 52/146 |
| 10,455,525 | B2* | 10/2019 | Yang | H04W 52/325 |
| 10,469,239 | B2* | 11/2019 | Jia | H04L 5/12 |
| 10,477,492 | B2* | 11/2019 | Seo | H04W 52/146 |
| 10,531,402 | B2* | 1/2020 | Liu | H04W 56/0045 |
| 10,568,041 | B2* | 2/2020 | MolavianJazi | H04W 52/242 |
| 10,568,121 | B2* | 2/2020 | Nikopour | H04W 72/1273 |
| 10,660,044 | B2* | 5/2020 | MolavianJazi | H04L 5/001 |
| 10,694,470 | B2* | 6/2020 | Yi | H04W 52/146 |
| 10,694,472 | B2* | 6/2020 | Liu | H04W 52/08 |
| 10,772,047 | B2* | 9/2020 | Chen | H04W 52/146 |
| 10,951,456 | B2* | 3/2021 | Nakamura | H04L 27/3488 |
| 10,959,193 | B2* | 3/2021 | Ouchi | H04W 52/367 |
| 10,986,583 | B2* | 4/2021 | MolavianJazi | H04W 52/362 |
| 11,025,456 | B2* | 6/2021 | Chatterjee | H04W 72/1273 |
| 11,071,155 | B2* | 7/2021 | Baghel | H04W 52/10 |
| 11,075,678 | B2* | 7/2021 | Yum | H04B 7/0626 |
| 2004/0033782 | A1* | 2/2004 | Horng | H04B 7/0669 455/69 |
| 2009/0197632 | A1* | 8/2009 | Ghosh | H04W 52/34 455/522 |
| 2010/0087221 | A1* | 4/2010 | Srinivasan | H04W 52/343 455/522 |
| 2010/0173653 | A1* | 7/2010 | Catovic | H04W 36/0072 455/464 |
| 2011/0081933 | A1* | 4/2011 | Suh | H04B 17/364 455/509 |
| 2011/0263216 | A1* | 10/2011 | Lee | H04W 52/367 455/127.1 |
| 2012/0021800 | A1* | 1/2012 | Wilson | H04B 1/3838 455/550.1 |
| 2012/0165053 | A1* | 6/2012 | Yoon | H04L 5/0048 455/501 |
| 2012/0178381 | A1* | 7/2012 | Jiang | H04B 7/0617 455/69 |
| 2012/0238305 | A1* | 9/2012 | Xiao | H04W 52/40 455/509 |
| 2012/0270519 | A1* | 10/2012 | Ngai | H04W 52/38 455/404.1 |
| 2012/0270592 | A1* | 10/2012 | Ngai | H04W 52/226 455/522 |
| 2013/0157709 | A1* | 6/2013 | Ji | H04W 52/143 455/522 |
| 2014/0113645 | A1* | 4/2014 | Sagae | H04W 72/082 455/452.1 |
| 2014/0135054 | A1* | 5/2014 | Chiou | H04W 52/367 455/522 |
| 2014/0254455 | A1* | 9/2014 | Nikopour | H04W 72/0466 370/312 |
| 2015/0016291 | A1* | 1/2015 | Kim | H04B 7/0413 370/252 |
| 2015/0124720 | A1* | 5/2015 | Morimoto | H04L 5/0073 370/329 |
| 2015/0230186 | A1* | 8/2015 | Chiou | H03G 3/3042 455/522 |
| 2016/0065401 | A1* | 3/2016 | Jia | H04L 5/0003 375/298 |
| 2016/0205632 | A1* | 7/2016 | Yi | H04W 52/346 455/522 |
| 2016/0309429 | A1* | 10/2016 | Yin | H04W 52/146 |
| 2017/0013565 | A1* | 1/2017 | Pelletier | H04W 52/365 |
| 2017/0055223 | A1* | 2/2017 | Shao | H04W 52/04 |
| 2017/0111891 | A1* | 4/2017 | He | H04W 52/367 |
| 2017/0208638 | A1* | 7/2017 | Baghel | H04W 52/04 |
| 2017/0230843 | A1* | 8/2017 | Ouchi | H04B 7/063 |
| 2017/0230913 | A1* | 8/2017 | Ouchi | H04W 74/0833 |
| 2017/0280441 | A1* | 9/2017 | Shimezawa | H04W 72/0446 |
| 2018/0014259 | A1* | 1/2018 | Yang | H04L 1/18 |
| 2018/0026743 | A1* | 1/2018 | Zhang | H04B 7/0632 370/329 |
| 2018/0083760 | A1* | 3/2018 | Jia | H04L 5/12 |
| 2018/0227857 | A1* | 8/2018 | Shao | H04W 52/40 |
| 2018/0249458 | A1* | 8/2018 | He | H04L 5/0055 |
| 2018/0332541 | A1* | 11/2018 | Liu | H04W 52/241 |
| 2018/0368111 | A1* | 12/2018 | Yamada | H04B 7/0639 |
| 2019/0044639 | A1* | 2/2019 | Ouchi | H04W 52/34 |
| 2019/0045456 | A1* | 2/2019 | Seo | H04W 4/40 |
| 2019/0074876 | A1* | 3/2019 | Kakishima | H04L 5/0048 |
| 2019/0074883 | A1* | 3/2019 | Park | H04B 7/0626 |
| 2019/0141642 | A1* | 5/2019 | Liu | H04W 52/281 |
| 2019/0149365 | A1* | 5/2019 | Chatterjee | H04L 25/0226 370/329 |
| 2019/0159135 | A1* | 5/2019 | MolavianJazi | H04W 52/362 |
| 2019/0159136 | A1* | 5/2019 | MolavianJazi | H04W 52/146 |
| 2019/0200248 | A1* | 6/2019 | Basu Mallick | H04L 41/0672 |
| 2019/0364513 | A1* | 11/2019 | Liu | H04W 52/146 |
| 2020/0022097 | A1* | 1/2020 | Wang | H04W 52/146 |
| 2020/0029281 | A1* | 1/2020 | Wang | H04W 52/34 |
| 2020/0053659 | A1* | 2/2020 | Wang | H04W 52/365 |
| 2020/0137819 | A1* | 4/2020 | Shi | H04W 52/365 |
| 2020/0267668 | A1* | 8/2020 | Xu | H04W 52/04 |
| 2020/0275382 | A1* | 8/2020 | Liu | H04W 52/242 |
| 2020/0280928 | A1* | 9/2020 | MolavianJazi | H04W 72/1284 |
| 2020/0296673 | A1* | 9/2020 | Ouchi | H04J 1/00 |
| 2020/0304192 | A1* | 9/2020 | Yum | H04L 1/0026 |
| 2020/0322208 | A1* | 10/2020 | Nakamura | H04L 1/0005 |
| 2020/0337083 | A1* | 10/2020 | Loehr | H04W 74/0808 |
| 2020/0351409 | A1* | 11/2020 | Karampatsis | H04W 12/63 |
| 2020/0374808 | A1* | 11/2020 | Zhang | H04W 52/42 |
| 2020/0396024 | A1* | 12/2020 | Ganesan | H04L 1/1812 |
| 2021/0051005 | A1* | 2/2021 | Kunz | H04W 12/04 |
| 2021/0058833 | A1* | 2/2021 | Basu Mallick | H04W 76/23 |
| 2021/0084586 | A1* | 3/2021 | Loehr | H04W 76/28 |
| 2021/0092789 | A1* | 3/2021 | Basu Mallick | H04W 76/18 |

OTHER PUBLICATIONS

Written Opinion of the International Searching Authority issued in PCT/JP2017/040465 dated Jan. 30, 2018 (5 pages).

(56) References Cited

OTHER PUBLICATIONS

Nokia, Nokia Shanghai Bell; "On power sharing between LTE and NR in DC"; 3GPP TSG-RAN WG1 Meeting #90, R1-1714097; Prague, Czech Republic; Aug. 21-25, 2017 (4 pages).

LG Electronics; "Discussion on further details on dynamic power sharing for LTE-NR DC"; 3GPP TSG RAN WG1 Meeting 90bis, R1-1717984; Prague, CZ; Oct. 9-13, 2017 (3 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Extended European Search Report issued in European Application No. 17931489.3, dated May 27, 2021 (14 pages).

\* cited by examiner

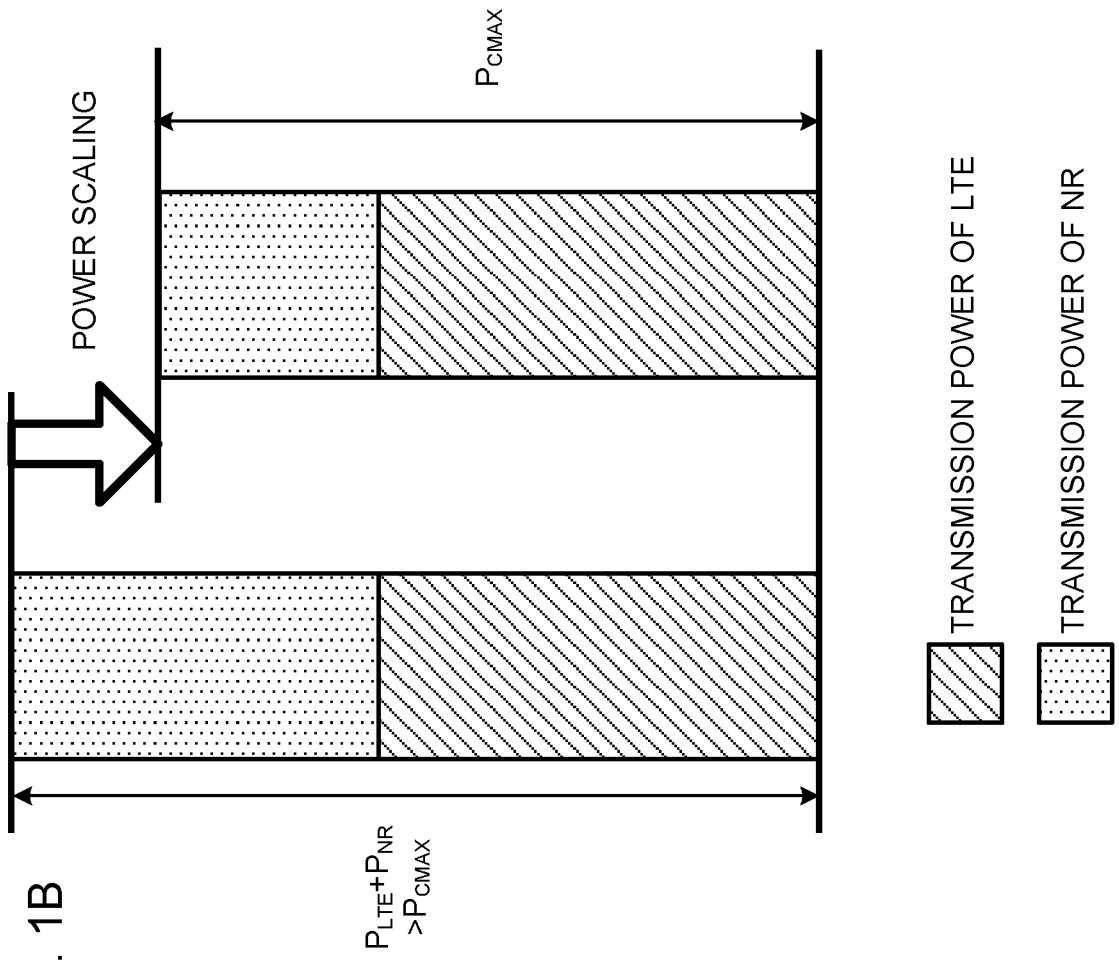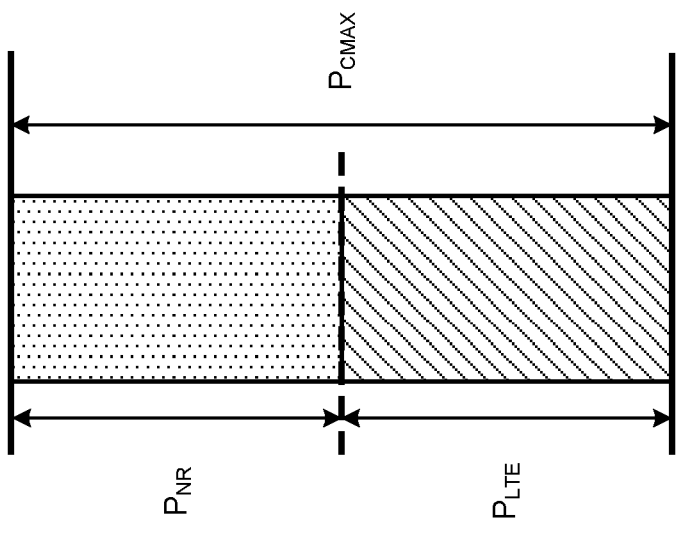

USER TERMINAL AND RADIO COMMUNICATION METHOD

TECHNICAL FIELD

The present disclosure relates to a user terminal and a radio communication method in next-generation mobile communication systems.

BACKGROUND ART

In the Universal Mobile Telecommunications System (UMTS) network, the specifications of Long Term Evolution (LTE) have been drafted for the purpose of further increasing high speed data rates, providing lower latency and so on (see Non-Patent Literature 1). For the purpose of achieving higher capacity, further advancement of LTE (LTE Rel. 8, Rel. 9), and so on, the specifications of LTE-A (LTE-Advanced, LTE Rel. 10, Rel. 11, Rel. 12, Rel. 13) have been drafted.

Successor systems of LTE (also referred to as, for example, "Future Radio Access (FRA)," "5th generation mobile communication system (5G)," "5G+(plus)," "New Radio (NR)," "New radio access (NX)," "Future generation radio access (FX)," "LTE Rel. 14," "LTE Rel. 15" (or later versions), and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), operations in which a user terminal (User Equipment (UE)) uses communication of a plurality of Radio Access Technologies (RATs) is under study.

However, the use of an existing power control method of semi-statically configuring maximum transmission power of each RAT may cause the UE to run short of transmission power at a cell edge, may reduce coverage, and may reduce system throughput, for example.

In view of this, the present disclosure has one object to provide a user terminal and a radio communication method that can prevent reduction of throughput and so on even when a plurality of RATs are used.

Solution to Problem

A user terminal according to one aspect of the present disclosure includes: a transmitting section that performs transmission by using a plurality of Radio Access Technologies (RATs); a receiving section that receives allocation configuration information including a plurality of pieces of information each related to an allocation of maximum transmission power for each of the plurality of RATs; and a control section that determines an allocation of maximum transmission power of each of the plurality of RATs from a plurality of allocations, based on the allocation configuration information.

Advantageous Effects of Invention

According to the present disclosure, reduction of throughput and so on can be prevented even when a plurality of RATs are used.

BRIEF DESCRIPTION OF DRAWINGS

FIGS. 1A and 1B are each a diagram to show an example of power control when simultaneous transmission of LTE and NR is performed;

DESCRIPTION OF EMBODIMENTS

Figure 2:
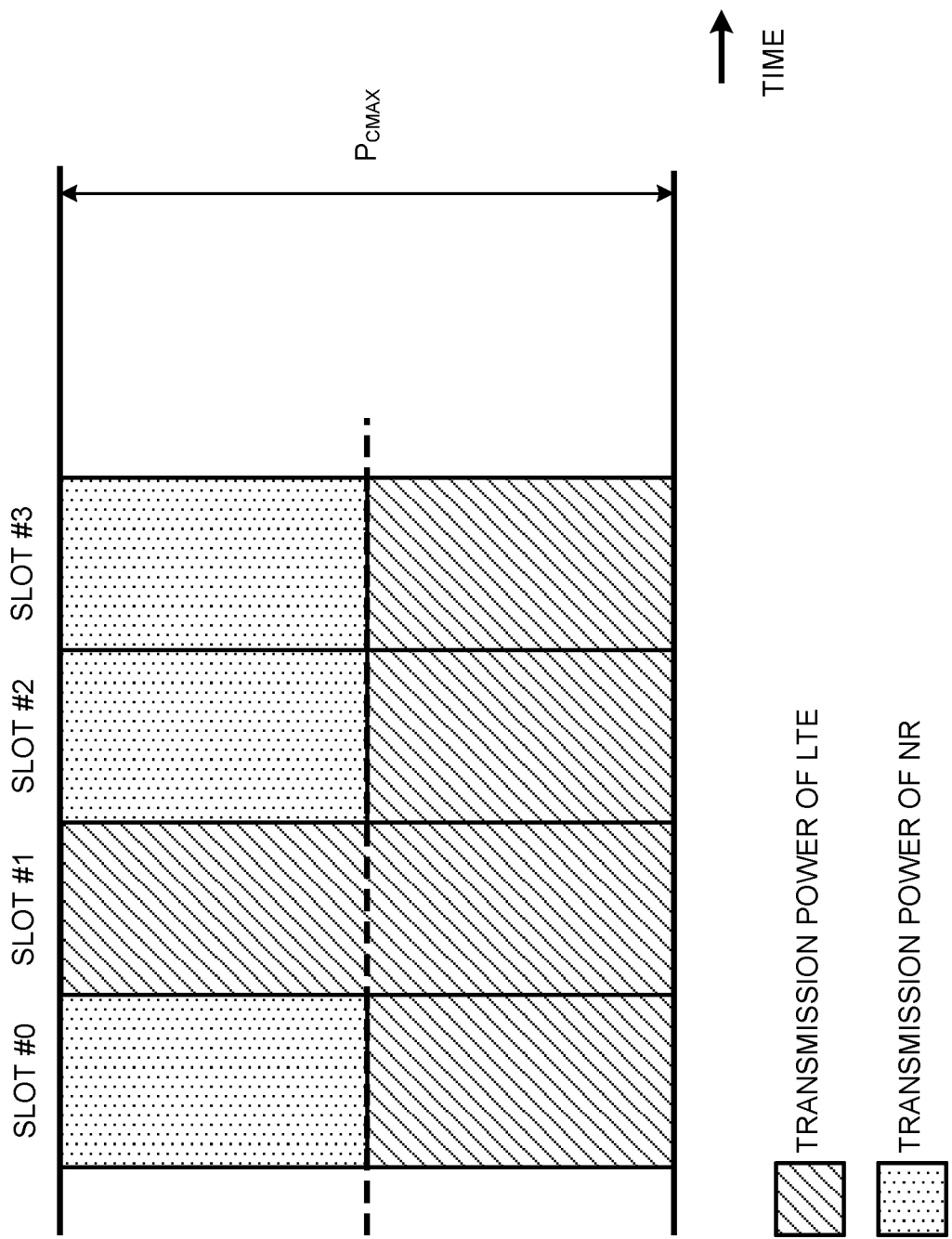
FIG. 2 is a diagram to show an example of control of an allocation of maximum transmission power according to one embodiment.

Operations in which a UE uses communication of a plurality of Radio Access Technologies (RATS) is under study. For example, operations in which the UE carries out both of communication in accordance with existing LTE (or extended systems of existing LTE) and communication in accordance with NR is under study. Such operations are also referred to as LTE-NR non stand-alone (NSA) operation.

In the NSA operation, a cell group (CG) including only cells for LTE and a CG including only cells for NR may be configured for the UE. One or a plurality of CGs each including cells for LTE and cells for NR may be configured for the UE. Note that each cell group may include at least one cell (component carrier (CC)).

In the NSA operation, how to allocate (or share) $P_{CMAX}$ corresponding to maximum transmission power of the UE is under study. Here, $P_{CMAX}$ may be configured maximum UE output power (similar to that defined in LIE), or may be a power parameter determined to be different from that defined in LTE.

Maximum transmission power of each RAT may be configured for the UE. For example, $P_{LTE}$ being a maximum allowed power value for LTE and $P_{NR}$ being a maximum allowed power value for NR may be separately (independently) configured for the UE.

For example, when NR is configured for the UE, $P_{LTE}$ may be set to a value equal to or less than $P_{CMAX}$, and $P_{NR}$ may be set to a value equal to or less than $P_{CMAX}$. Further, the values may be set so as to satisfy $P_{LTE}+P_{NR}>P_{CMAX}$ or may be set so as to satisfy $P_{LTE}+P_{NR} \leq P_{CMAX}$.

It may be assumed that the UE configured with NR can surely support a given combination of $P_{LTE}$ and $P_{NR}$ (the UE may be required to support the combination), or support of another given combination may depend on UE capability. For example, it may be assumed that the UE can surely support $P_{LTE}+P_{NR} \le P_{CMAX}$ or it may be assumed that whether or not the UE can support $P_{LTE}+P_{NR}>P_{CMAX}$ depends on capability of the UE.

When total transmission power (which may be referred to as instantaneous maximum transmission power and so on) of the UE exceeds $P_{CMAX}$ due to simultaneous transmission of LTE and NR (when a situation enters a "power-limited" state), the UE may reduce (scale) transmission power of NR in one or a plurality of carriers, or may drop (stop) transmission of NR in one or a plurality of carriers. In this case, transmission power of LTE may be maintained (or may not be changed).

Note that when transmission of NR occurs in a plurality of CCs or a plurality of CGs in the power-limited situation, the UE may apply scaling uniformly (for example, by using the same absolute value, at the same ratio with respect to $P_{CMAX}$, and so on), or may apply weighted scaling to such a plurality of CCs or a plurality of CGs.

When communication of both of LTE and NR is performed by using a plurality of chips, it may be assumed that the above-described scaling/drop of NR in the power-limited situation is not performed. When communication of both of LTE and NR is performed by using one chip, it may be assumed that the above-described scaling/drop of NR in the power-limited situation is performed. This is because a single chip enables appropriate cooperative control between RATS.

Note that this control may be performed when a specific condition is satisfied. For example, the specific condition may be a condition that operation based on a short TTI (sTTI) in the DL and/or the UL or based on reduced UE processing time is not configured for the UE.

The UE may notify the base station of, for example, the above-described UE capability information, information related to a configuration of implementation for performing LTE and/or NR communication (for example, information as to whether or not LTE communication and NR communication are performed using the same chip), and so on by means of higher layer signaling.

For example, the higher layer signaling may be any one or combinations of Radio Resource Control (RRC) signaling, Medium Access Control (MAC) signaling (for example, a MAC control element (MAC CE) and a MAC PDU (Protocol Data Unit)), and so on.

FIGS. 1A and 1B are each a diagram to show an example of power control when simultaneous transmission of LTE and NR is performed. FIG. 1A shows an example in which $P_{LTE}$ and $P_{NR}$ that satisfy $P_{LTE}+P_{NR} \le P_{CMAX}$ are configured for the UE. In this case, even when simultaneous transmission of LTE and NR is performed, transmission power of either of the systems does not receive any restriction due to transmission power of the other system.

FIG. 1B shows an example in which $P_{LTE}$ and $P_{NR}$ that satisfy $P_{LTE}+P_{NR}>P_{CMAX}$ are configured for the UE. In this case, unless $P_{LTE}>P_{CMAX}$, the UE may maintain transmission power of LTE and scale or drop transmission power of NR so as to adjust the total transmission power to $P_{CMAX}$ or less.

Even when the UE does not perform transmission in a given RAT in a situation in which maximum transmission power of each RAT ($P_{LTE}$, $P_{NR}$, and so on) is semi-statically configured for the UE, the UE cannot utilize unused power for the given RAT as transmission power for another RAT.

When dropping of transmission in a given RAT is not supported, the UE cannot increase transmission power for another RAT to $P_{CMAX}$, unless maximum transmission power allocated for the given RAT is brought to 0.

In consideration of such circumstances as described above, the use of an existing power control method of semi-statically configuring maximum transmission power of each RAT may cause the UE to run short of transmission power at a cell edge, may reduce coverage, and may reduce system throughput.

In view of this, the inventor of the present invention came up with the idea of a method of flexibly controlling maximum transmission power. For example, in one aspect of the present invention, a plurality of allocations of maximum transmission power for each RAT are configured for the UE, and the UE switchably uses the plurality of allocations. According to such a configuration, flexible control can be implemented.

Embodiments according to the present disclosure will be described in detail with reference to the drawings as follows. The radio communication method according to each embodiment may be employed independently or may be employed in combination.

Note that "RAT/CG" as used in the description of this specification may be interpreted as "RAT and/or CG", and a RAT and a CG may be used interchangeably.

(Radio Communication Method)

In one embodiment of the present disclosure, a plurality of patterns of allocations of maximum transmission power of each RAT/CG are configured for the UE. The UE determines an allocation of maximum transmission power to be used, based on a specific condition.

The UE may determine an allocation of maximum transmission power, based on whether or not a slot used to perform transmission is a specific slot. For example, the UE may perform control such that the UE uses the first allocation when the slot is the specific slot and uses the second allocation when the slot is a slot other than the specific slot. For example, the first allocation may be an allocation in which power is allocated more for one RAT/CG rather than another (for example, ($P_{LTE}$, $P_{NR}$)=(23 dBm, 0 dBm)), and the second allocation may be an allocation in which power is equally allocated for a plurality of RATs/CGs (for example, ($P_{LTE}$, $P_{NR}$)=(20 dBm, 20 dBm)).

Information related to an allocation of maximum transmission power of the UE for each RAT/CG (for example, $P_{LTE}$ and/or $P_{NR}$) may be notified to the UE (configured for the UE) by means of higher layer signaling. For example, $P_{LTE}$ and $P_{NR}$ corresponding to a given allocation may be notified to the UE either simultaneously or separately. When one of $P_{LTE}$ and $P_{NR}$ is notified, the UE may derive the other value based on the notified value.

Note that $P_{LTE}$ and/or $P_{NR}$ may be designated using an absolute value, such as 20 dBm, or may be designated using a ratio with respect to $P_{CMAX}$ (such as x %). The information related to an allocation may be referred to as information for configuring an allocation (allocation configuration information).

Allocation configuration information of a plurality of RATs/CGs may be collectively notified to the UE on any one carrier of the RATs/CGs, or allocation configuration information corresponding to each of the RATs/CGs may be notified to the UE. For example, when $P_{LTE}$ and $P_{NR}$ are separately notified, the UE may receive information of $P_{LTE}$ on an LTE carrier, and may receive information of $P_{NR}$ on an NR carrier.

When $P_{LTE}$ and $P_{NR}$ are separately notified, the UE may receive information of both of $P_{LTE}$ and $P_{NR}$ on any one carrier, or such values may be notified to the UE by means of separate signalings (or parameters).

Note that the UE may assume that one of $P_{LTE}$ and $P_{NR}$ is $P_{CMAX}$. For example, when information of $P_{LTE}$ (or $P_{NR}$) is not notified, the UE may assume that $P_{LTE}$ (or $P_{NR}$)=$P_{CMAX}$.

The allocation configuration information may include a plurality of pieces of information each related to an allocation of maximum transmission power of the UE for each RAT/CG. For example, the allocation configuration information may include information related to the above-described first allocation and second allocation. The plurality of allocations configured according to respective pieces of allocation configuration information may be associated with their individual indices.

FIG. 2 is a diagram to show an example of control of an allocation of maximum transmission power according to one embodiment. In present example, the specific slot is slot #1. The UE is configured to perform power control by using ($P_{LTE}$, $P_{NR}$)=(23 dBm, 0 dBm) in the specific slot, and perform power control by using ($P_{LTE}$, $P_{NR}$)=(20 dBm, 20 dBm) in slots other than the specific slot. Note that it is herein assumed that $P_{CMAX}$=23 dBm.

In a case of the present example, the UE can use transmission power of LTE up to $P_{CMAX}$ in slot #1, and can thus widen coverage of LTE in the slot. In slots other than slot #1, maximum transmission power can be equally allocated for LTE and NR, and thus coverage according to both the systems can be secured.

Note that the above-mentioned "specific slot" may be a slot that varies depending on a RAT/CG. For example, a slot number of the "specific slot" of an LTE carrier and a slot number of the "specific slot" of an NR carrier may be different from each other. As shown in FIG. 2, when different RATs synchronize with each other, it is assumed that their specific slots indicate the same transmission timing. However, when different RATs employ different slot lengths or when different RATs do not synchronize with each other, it is assumed that their "specific slots" are different.

The UE may determine (specify) an allocation of maximum transmission power to be used in a given period (for example, a slot) among a plurality of allocations configured according to the allocation configuration information, based on information for specifying an allocation of maximum transmission power of the UE for each RAT/CG (the information may be referred to as allocation specification information).

The allocation specification information may be notified to the UE from the base station by means of any one or a combination of higher layer signaling and physical layer signaling (for example, downlink control information (DCI)), or may be defined in a specification in advance. Note that the allocation specification information may be notified to the UE simultaneously with the allocation configuration information, or may be notified individually.

Allocation specification information of a plurality of RATs/CGs may be collectively notified to the UE on any one carrier of the RATs/CGs, or allocation specification information corresponding to each of the RATs/CGs may be notified to the UE.

Here, for example, the higher layer signaling may be any one or combinations of RRC signaling, MAC signaling, broadcast information (master information block (MIB), system information block (SIB), and minimum system information (Remaining Minimum System Information (RMSI))), and so on. Note that the higher layer signaling, the physical layer signaling, and so on used in this specification may include (may mean) signaling defined for each RAT, and may include, for example, any one or both of signaling of LTE and signaling of NR.

The allocation specification information may include information related to the specific slot (for example, information as to which allocation is applied to which slot). The information related to the specific slot may be, for example, information indicating characteristics (and/or a pattern) of the specific slot.

For example, the information may include information of a slot number (slot index), periodicity, and an offset associated with the specific slot in a given RAT/CG, and so on. Information indicating a slot number may be information indicating that the slot number is an odd number, an even number, a multiple of a given number, and so on.

The UE may receive trigger information for triggering control of an allocation of maximum transmission power in the specific slot. For example, when the UE receives information for enabling (turning on) the trigger, the UE may apply, to a slot corresponding to the specific slot that is configured in advance, an allocation of maximum transmission power that is different from that of other slots. When the UE receives information for disabling (turning off) the trigger, the UE may also apply, to a slot corresponding to the specific slot, an allocation of maximum transmission power that is the same as that of other slots. The trigger information may be referred to as activation/deactivation information.

The specific slot may be a slot used to perform specific UL transmission in a given RAT/CG. For example, the specific slot may be at least one of a slot used to perform UL grant-based transmission, a slot used to perform UL grant-free transmission, a slot used to transmit a given channel, a slot used to transmit given uplink control information (UCI), a slot used to transmit a measurement reference signal (Sounding Reference Signal (SRS)), and so on. The information related to the specific slot may be information indicating at least one of these slots.

Note that the above given channel may be, for example, at least one of a random access channel (Physical Random Access Channel (PRACH)), an uplink control channel (Physical Uplink Control Channel (PUCCH)), an uplink shared channel (Physical Uplink Shared Channel (PUSCH)), and so on, but is not limited to these. Note that the channel/signal and so on used in this specification may include (may mean) a channel/signal and so on defined for each RAT, and may include, for example, any one or both of a channel/signal of LTE and a channel/signal of NR.

The above given UCI may be at least one of, for example, transmission confirmation information (HARQ-ACK), a scheduling request (SR), channel state information (CSI), and so on, but is not limited to these.

The allocation specification information may include information that explicitly or implicitly designates an allocation of maximum transmission power (the information may be referred to as allocation designation information). It is preferable that the allocation designation information be notified by means of MAC signaling (for example, a MAC CE) and/or physical layer signaling (for example, DCI).

The UE may determine the use of any one of a plurality of allocations configured according to the allocation configuration information, based on the allocation designation information. The allocation designation information may indicate an index corresponding to a configured allocation, or may indicate information for indicating switch (change) to another allocation.

Note that the allocation specification information may include a combination of the information related to the specific slot and the allocation designation information that designates an allocation in the specific slot.

The allocation designation information may be information that directly designates the information related to an allocation of maximum transmission power of the UE for each RAT/CG (for example, $P_{LTE}$ and/or $P_{NR}$). In this case, the UE may use an allocation of maximum transmission power designated by the allocation designation information, irrespective of whether the allocation configuration information is received (even if an allocation is not configured according to the allocation configuration information).

Regarding the allocation of maximum transmission power of the UE for each RAT/CG, a default allocation (for example, equal allocation) may be defined in a specification in advance. Even when the UE receives none of the allocation configuration information or the allocation designation information, the UE may judge an allocation of maximum transmission power, based on the default allocation.

The allocation designation information may be included in a UL grant. In this case, it may be assumed that the UE applies the allocation of maximum transmission power judged based on the allocation designation information to UL transmission that is indicated by the UL grant and does not apply the allocation to other UL transmission (for example, uses the default allocation for other UL transmission).

When a given condition is satisfied, it may be assumed that the UE uses the default allocation. For example, when a radio link failure (RLF) is detected on any of the RATs/CGs, a common search space is monitored, and so on, it may be assumed that the UE controls transmission power of a signal (for example, a PRACH) of a given RAT/CG, based on the default allocation.

When a given condition is satisfied in a given RAT/CG, the UE can use or may use transmission power of the RAT/CG up to $P_{CMAX}$. During this operation, the UE may suspend, skip, or drop transmission of other RATs/CGs. For example, when the UE performs transmission of the PRACH in a given RAT/CG, the UE may perform the transmission of the PRACH by using power of $P_{CMAX}$.

According to the embodiment described above, maximum transmission power of the UE can be effectively utilized. For example, even if maximum transmission power is semi-statically configured for each CG, the UE can change allocations of maximum transmission power in the specific slot and perform transmission with $P_{CMAX}$ in a given CG, and thus reduction of coverage of the given CG can be prevented.

<Variations>

Note that the allocation of maximum transmission power of each RAT/CG may be adjusted based on the number of active carriers (CCs) in each RAT/CG. For example, when CC(s) included in a given RAT/CG (for example, a secondary CG (SCG) used for communication of NR) is deactivated from an active state, the UE may assume that power for the CC(s) out of maximum transmission power to be allocated for the given RAT/CG becomes available in another RAT/CG (for example, a master CG (MCG)). The description "power becomes available" may be expressed as the description "power is transferred".

For example, suppose a CG for LTE and a CG for NR are configured for the UE. Here, when a CG for NR includes two CCs and one of the CCs is deactivated, the UE may assume that a part (for example, 50%) of $P_{NR}$ is transferred to LTE. When both the two CCs included in the CG for NR are deactivated, the UE may assume that a part or all (100%) of $P_{NR}$ is transferred to LTE.

Power to be transferred to another RAT when one CC associated with a given RAT/CG is deactivated may be calculated based on a value that is obtained by dividing maximum transmission power PRAT of the given RAT/CG by a total number of CCs configured for the UE regarding the given RAT/CG, or may be weighted depending on the CC.

Information as to whether or not power is transferred when one CC associated with a given RAT/CG is deactivated may be, for example, notified to the UE by means of higher layer signaling and so on. When the information indicates "no transfer", it may be assumed that the UE cannot transfer power to another RAT/CG even though one CC associated with the given RAT/CG is deactivated.

When a deactivated CC of a given RAT/CG is activated, transferred power may be returned to the given RAT/CG (transferred power may become available in the given RAT/CG).

Note that the expression "[being] deactivated" in the above description may be interpreted as "a radio link failure (RLF) is detected", "a timing advance timer has expired", "channel quality has fallen below a threshold", "when initial access is started (which may include beam recovery processing)", and so on.

The above-described embodiment illustrates, for the sake of simplicity, an example in which the UE performs simultaneous transmission of LTE and NR, but this is not restrictive. The invention described in the present disclosure is also applicable to a case in which the UE performs communication by using three or more RATS/CGs (for example, LTE, NR, and other RAT(s)).

For example, the invention described in the present disclosure is also applicable to a case in which the UE performs communication by using the same RAT in a plurality of CGs. For example, when CG 1 using NR and CG 2 using NR are configured for the UE, $P_{NR1}$ and $P_{NR2}$ may be configured as maximum transmission power of the respective CGs.

Note that the CG used in the description of this specification may be interpreted as one or more CCs (cells), one or more bandwidth parts (BWPs), and so on. Here, the BWP may be referred to as a partial frequency band, a partial band, and so on. In NR, one or a plurality of BWPs may be configured for the UE per CC.

$P_{CMAX}$ used in the description of this specification may be interpreted as other power values (for example, maximum allowed transmission power $P_{CMAX,c}$ of a component carrier). The slot used in the description of this specification may be interpreted as other time units (for example, a mini-slot, a subframe, a frame, a symbol, and so on).

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 3:
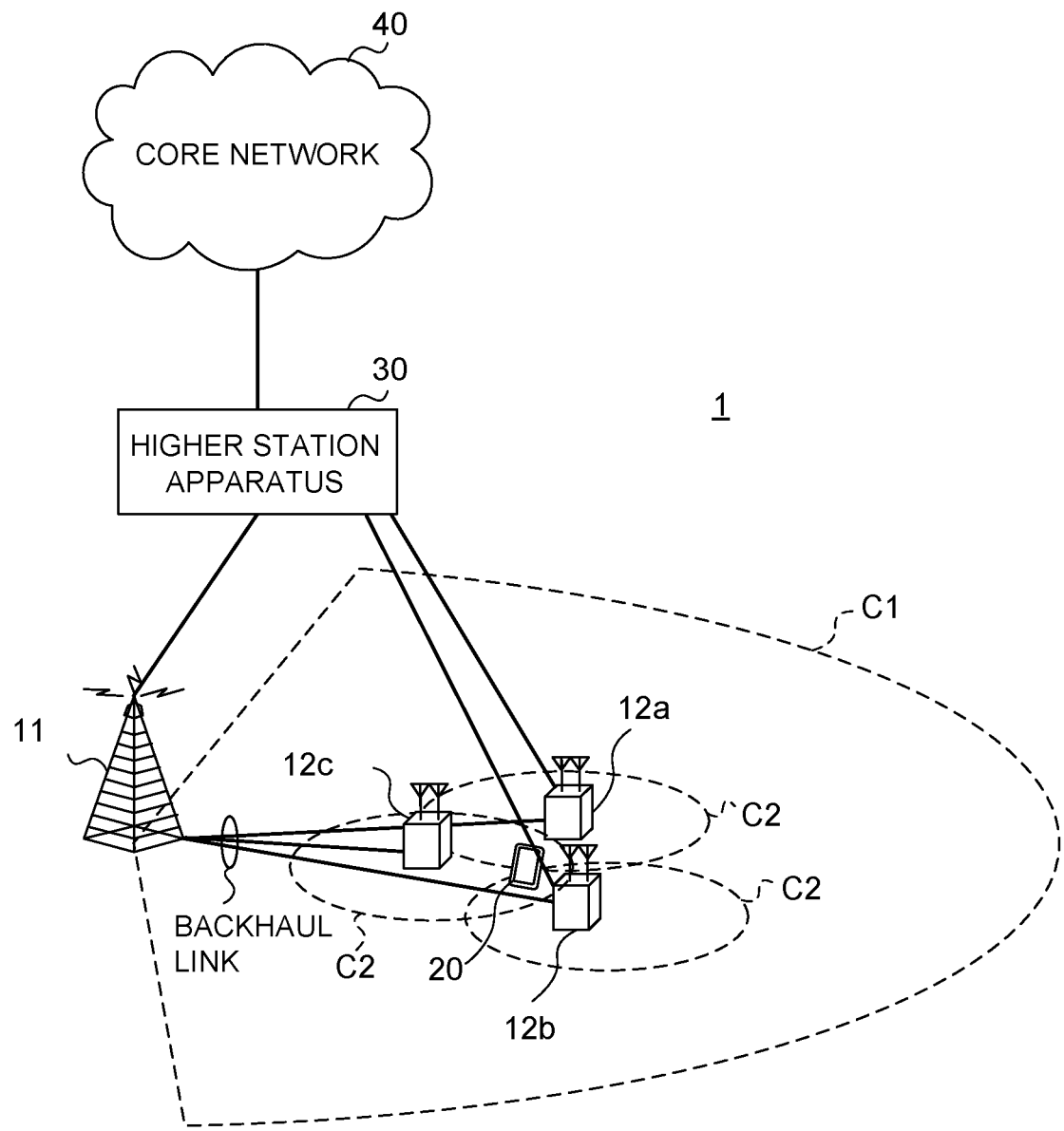
FIG. 3 is a diagram to show an example of a schematic structure of a radio communication system according to one embodiment.

FIG. 3 is a diagram to show an example of a schematic structure of the radio communication system according to one embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "Long Term Evolution (LTE)," "LTE-Advanced (LTE-A)," "LTE-Beyond (LTE-B)," "SUPER 3G," "IMT-Advanced," "4th generation mobile communication system (4G)," "5th generation mobile communication system (5G)," "New Radio (NR)," "Future Radio Access (FRA)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12*a* to 12*c*) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 can execute CA or DC by using a plurality of cells (CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

Numerologies may be communication parameters applied to transmission and/or reception of a given signal and/or channel, and for example, may indicate at least one of a subcarrier spacing, a bandwidth, a symbol length, a cyclic prefix length, a subframe length, a TTI length, the number of symbols per TTI, a radio frame structure, a filter processing, a windowing processing, and so on.

A wired connection (for example, means in compliance with the Common Public Radio Interface (CPRI) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNodeB (eNB)," a "transmitting/receiving point" and so on. The radio base stations 12 are radio base stations having local coverages, and may be referred to as "small base stations," "micro base stations," "pico base stations," "femto base stations," "Home eNodeBs (HeNBs)," "Remote Radio Heads (RRHs)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (Physical Downlink Shared Channel (PDSCH), which is used by each user terminal 20 on a shared basis, a broadcast channel (Physical Broadcast Channel (PBCH)), downlink L1/L2 control channels and so on, are used as downlink channels. User data, higher layer control information, System Information Blocks (SIBs) and so on are communicated on the PDSCH. The Master Information Blocks (MIBs) are communicated on the PBCH.

The downlink L1/L2 control channels include a Physical Downlink Control Channel (PDCCH), an Enhanced Physical Downlink Control Channel (EPDCCH), a Physical Control Format Indicator Channel (PCFICH), a Physical Hybrid-ARQ Indicator Channel (PHICH) and so on. Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Transmission confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on are used as uplink channels. User data, higher layer control information and so on are communicated on the PUSCH. In addition, radio quality information (Channel Quality Indicator (CQI)) of the downlink, transmission confirmation information, scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (Sounding Reference Signal (SRS)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

(Radio Base Station)

Figure 4:
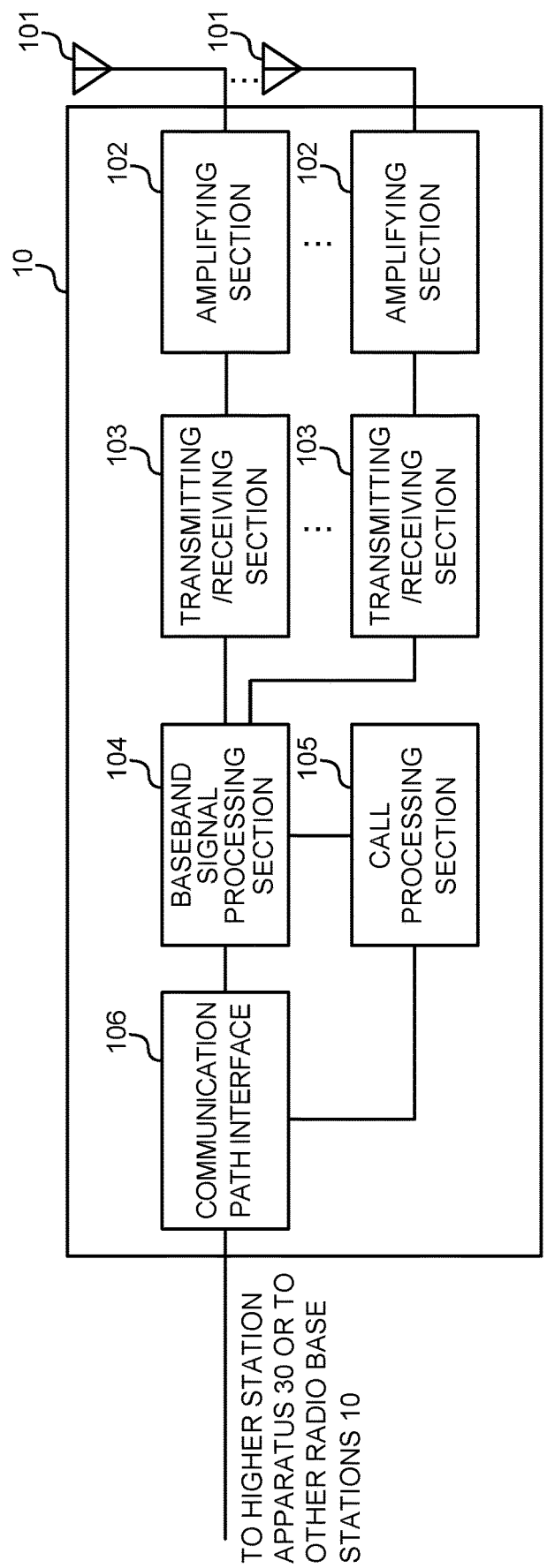
FIG. 4 is a diagram to show an example of an overall structure of a radio base station according to one embodiment.

FIG. 4 is a diagram to show an example of an overall structure of the radio base station according to one embodiment. A radio base station 10 includes a plurality of transmitting/receiving antennas 101, amplifying sections 102, transmitting/receiving sections 103, a baseband signal processing section 104, a call processing section 105 and a communication path interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the communication path interface 106.

In the baseband signal processing section 104, the user data is subjected to transmission processes, such as a Packet Data Convergence Protocol (PDCP) layer process, division and coupling of the user data, Radio Link Control (RLC) layer transmission processes such as RLC retransmission control, Medium Access Control (MAC) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (setting up, releasing and so on) for communication channels, manages the state of the radio base station 10, manages the radio resources and so on.

The communication path interface 106 transmits and/or receives signals to and/or from the higher station apparatus 30 via a given interface. The communication path interface 106 may transmit and/or receive signals (backhaul signaling) with other radio base stations 10 via an inter-base station interface (for example, an optical fiber in compliance with the Common Public Radio Interface (CPRI) and an X2 interface).

The transmitting/receiving sections 103 receive a signal and/or a channel transmitted using a plurality of RATs/CGs. The transmitting/receiving sections 103 may transmit, to the user terminal 20, information related to an allocation of maximum transmission power of the UE for each RAT/CG (allocation configuration information), allocation specification information, allocation designation information, information related to a specific slot (slot information), and so on.

Figure 5:
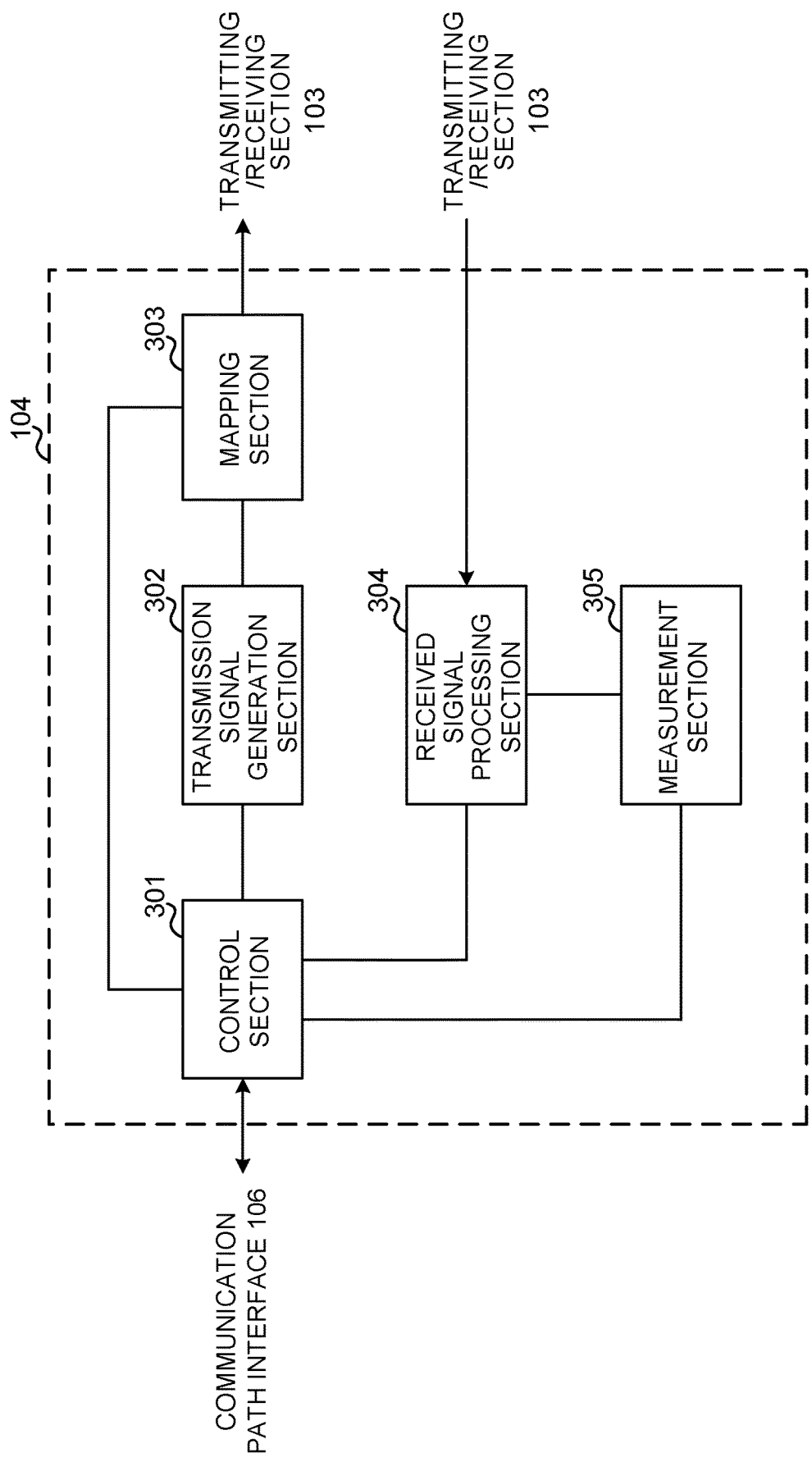
FIG. 5 is a diagram to show an example of a functional structure of the radio base station according to one embodiment.

FIG. 5 is a diagram to show an example of a functional structure of the radio base station according to one embodiment. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource assignment) of system information, a downlink data signal (for example, a signal transmitted on the PDSCH), a downlink control signal (for example, a signal transmitted on the PDCCH and/or the EPDCCH. Transmission confirmation information, and so on). Based on the results of determining necessity or not of retransmission control to the uplink data signal, or the like, the control section 301 controls generation of a downlink control signal, a downlink data signal, and so on. Further, the control section 301 controls the scheduling of a synchronization signal (for example, Primary Synchronization Signal (PSS)/Secondary Synchronization Signal (SSS)), a downlink reference signal (for example, CRS, CSI-RS, DMRS), and so on.

Further, the control section 301 controls scheduling of an uplink data signal (for example, a signal transmitted on the PUSCH), an uplink control signal (for example, a signal transmitted on the PUCCH and/or the PUSCH, transmission confirmation information, and so on), a random access preamble (for example, a signal transmitted on the PRACH), an uplink reference signal, and so on.

The control section 301 may perform control of transmitting, to the user terminal 20, information for controlling an allocation of maximum transmission power in each RAT. For example, the control section 301 may perform control of transmitting allocation configuration information, allocation specification information, and so on.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to given radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform Radio Resource Management (RRM) measurement, Channel State Information (CSI) measurement, and so on, based on the received signal. The measurement section 305 may measure a received power (for example, Reference Signal Received Power (RSRP)), a received quality (for example, Reference Signal Received Quality (RSRQ), an Signal to Interference plus Noise Ratio (SINR), an Signal to Noise Ratio (SNR)), a signal strength (for example, Received Signal Strength Indicator (RSSI)), channel information (for example, CSI), and so on. The measurement results may be output to the control section 301.

(User Terminal)

Figure 6:
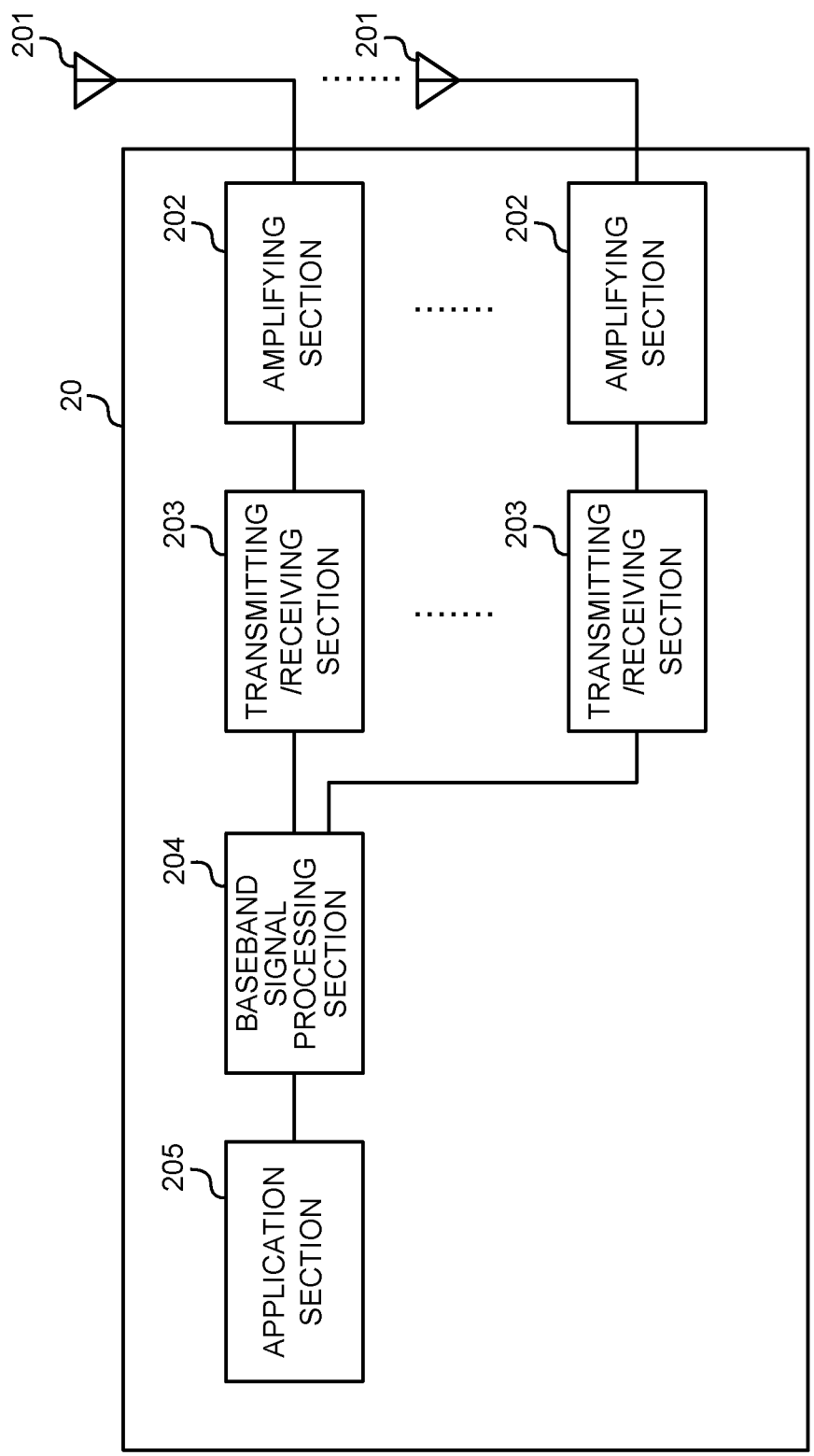
FIG. 6 is a diagram to show an example of an overall structure of a user terminal according to one embodiment.

FIG. 6 is a diagram to show an example of an overall structure of the user terminal according to one embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving sections 203 perform transmission by using a plurality of RATs/CGs. Further, the transmitting/receiving sections 203 may receive, from the radio base station 10, information related to an allocation of maximum transmission power of the UE for each RAT/CG (allocation configuration information), allocation specification information, allocation designation information, information related to a specific slot (slot information), and so on.

Figure 7:
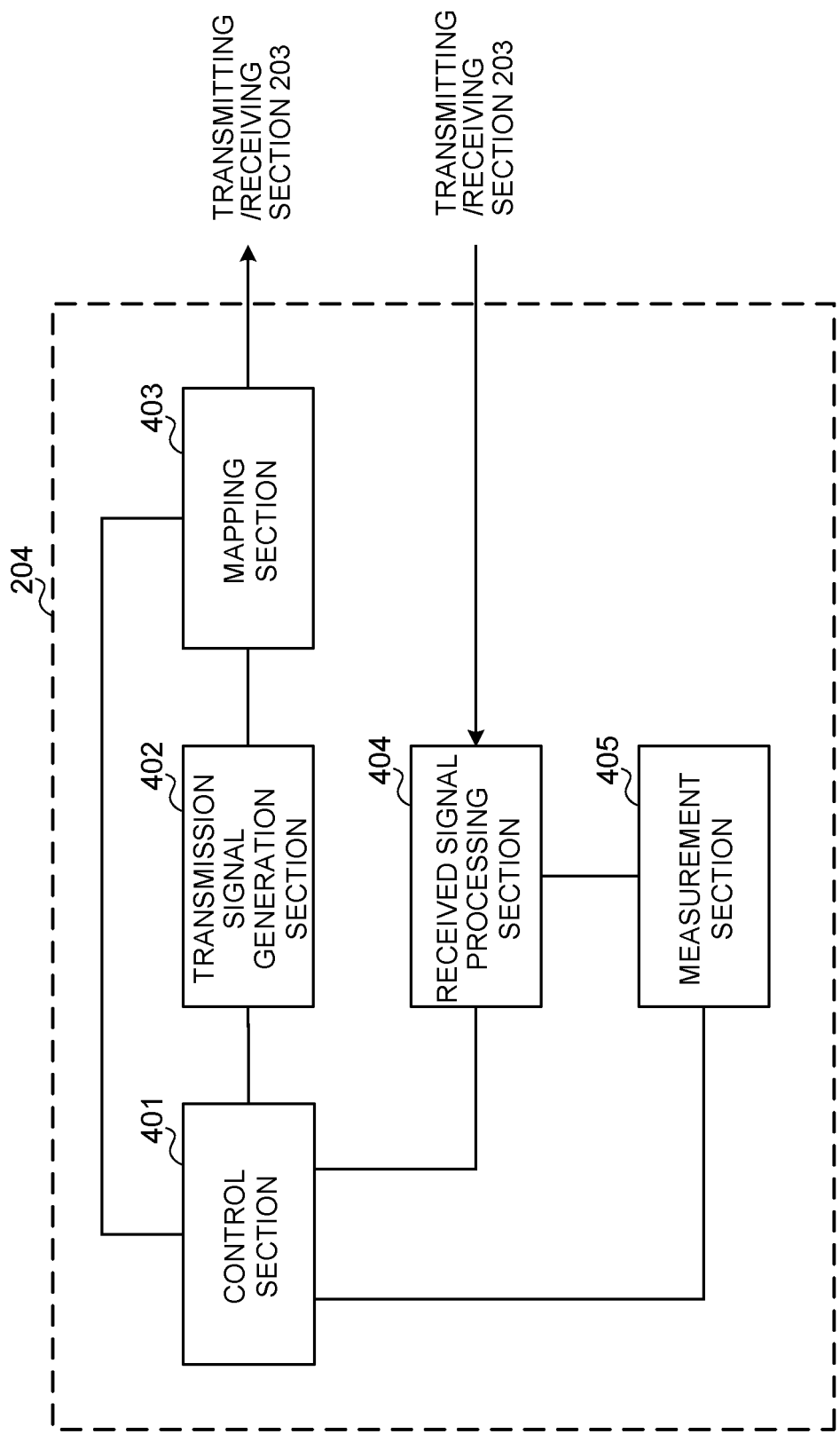
FIG. 7 is a diagram to show an example of a functional structure of the user terminal according to one embodiment.

FIG. 7 is a diagram to show an example of a functional structure of the user terminal according to one embodiment. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

The control section 401 may control transmission power in each RAT. Note that "each RAT" in this specification may be interpreted as a "plurality of RATS", a "plurality of CGs", and so on. The control section 401 may determine (judge) an allocation of maximum transmission power of each RAT from a plurality of allocations, based on allocation configuration information and/or allocation specification information acquired from the received signal processing section 404. For example, the control section 401 may use the allocation specification information to determine an allocation of maximum transmission power of each RAT from a plurality of allocations that are based on the allocation configuration information.

For example, based on whether or not a slot used to perform transmission is a specific slot, the control section 401 may determine an allocation of maximum transmission power of each RAT in the slot. The control section 401 may determine an allocation of maximum transmission power of each RAT, based on information (for example, an index) corresponding to any one of a plurality of allocations.

The control section 401 may adjust an allocation of maximum transmission power of each RAT (for example, increase or reduce maximum transmission power of a given RAT), based on the number of active carriers in each RAT.

If the control section 401 acquires a variety of information reported by the radio base station 10 from the received signal processing section 404, the control section 401 may update parameters to use for control, based on the information.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about transmission confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 8:
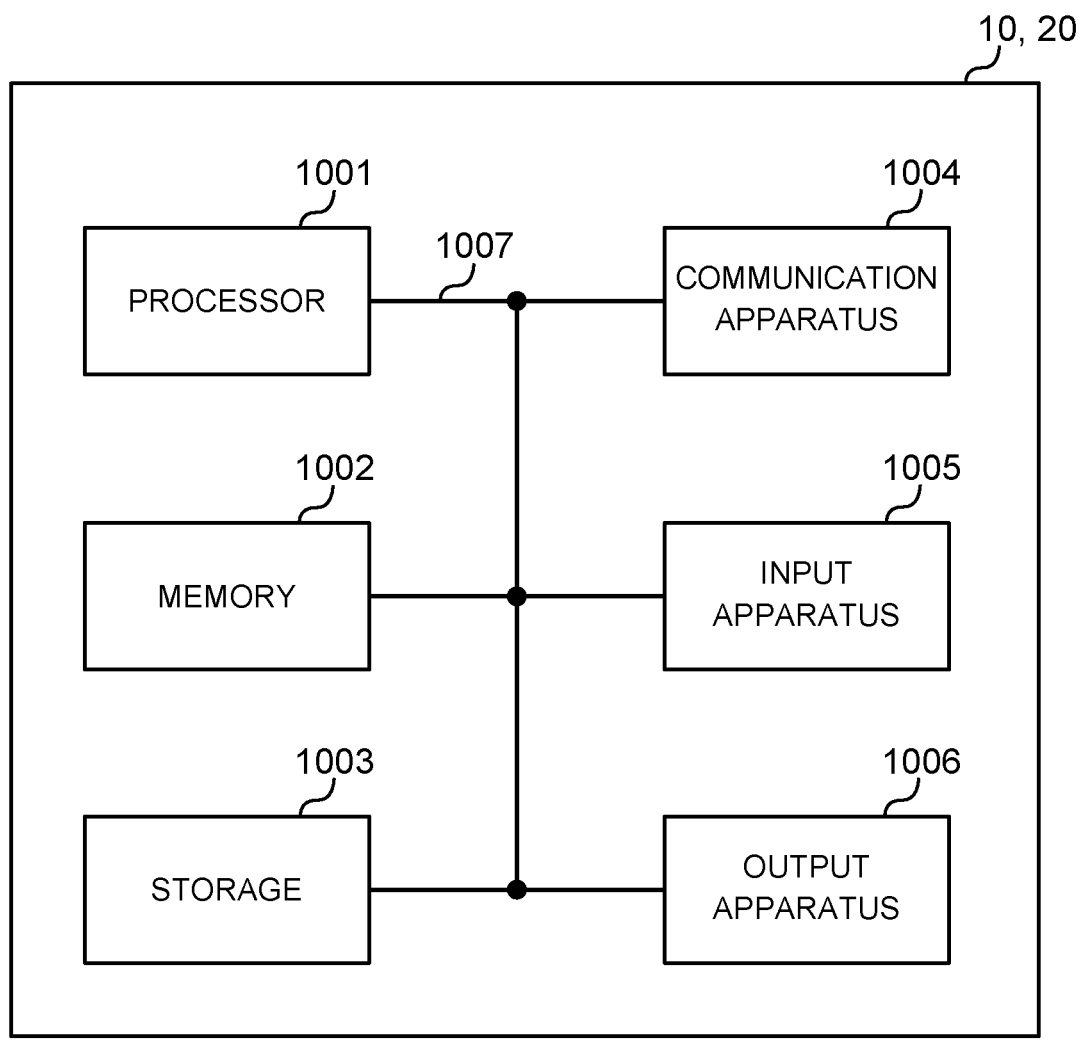
FIG. 8 is a diagram to show an example of a hardware structure of the radio base station and the user terminal according to one embodiment.

For example, a radio base station, a user terminal, and so on according to one embodiment of the present disclosure may function as a computer that executes the processes of the radio communication method of the present disclosure. FIG. 8 is a diagram to show an example of a hardware structure of the radio base station and the user terminal according to one embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control reading and/or writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and/or the like for implementing a radio communication method according to one embodiment.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an Application Specific Integrated Circuit (ASIC), a Programmable Logic Device (PLD), an FPGA (Field Programmable Gate Array), and so on, and part or all of the functional blocks may be implemented by the hardware. For example, the processor 1001 may be implemented with at least one of these pieces of hardware.

(Variations)

Note that the terminology used in this specification and/or the terminology that is needed to understand this specification may be replaced by other terms that convey the same or similar meanings. For example, "channels" and/or "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

Furthermore, a radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may have a fixed time length (for example, 1 ms) independent of numerology.

Furthermore, a slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to given values, or may be represented in another corresponding information. For example, radio resources may be specified by given indices.

The names used for parameters and so on in this specification are in no respect limiting. For example, since various channels (Physical Uplink Control Channel (PUCCH), Physical Downlink Control Channel (PDCCH), and so on) and information elements can be identified by any suitable names, the various names assigned to these individual channels and information elements are in no respect limiting.

The information, signals, and/or others described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used in this specification are used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably.

A mobile station may be referred to as, by a person skilled in the art, a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/embodiment of the present disclosure may be applied to a configuration in which communication between a radio base station and a user terminal is replaced with communication among a plurality of user terminals (Device-to-Device (D2D)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GW), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-RAT (Radio Access Technology), New Radio (NR), New radio access (NX), Future generation radio access (FX), GSM (registered trademark) (Global System for Mobile communications), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions, (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the invention according to the present disclosure has been described in detail above, it should be obvious to a person skilled in the art that the invention according to the present disclosure is by no means limited to the embodiments described in this specification. The invention according to the present disclosure can be implemented with various corrections and in various modifications, without departing from the spirit and scope of the invention defined by the recitations of claims. Consequently, the description in this specification is provided only for the purpose of explaining examples, and should by no means be construed to limit the invention according to the present disclosure in any way.

What is claimed is:

1. A terminal comprising:
    a receiver that receives information regarding a specific uplink transmission subframe of a cell group (CG); and
    a processor that determines an allocation of maximum transmission power of each CG for the specific uplink transmission subframe of the CG indicated by the information and determines another allocation of maximum transmission power of each CG for other than the specific uplink transmission subframe,
    wherein each CG uses a different Radio Access Technology.

2. A radio communication method for a terminal, comprising:
    receiving information regarding a specific uplink transmission subframe of a cell group (CG); and
    determining an allocation of maximum transmission power of each CG for the specific uplink transmission subframe of the CG indicated by the information and determining another allocation of maximum transmission power of each CG for other than the specific uplink transmission subframe,
    wherein each CG uses a different Radio Access Technology.

3. A base station comprising:
    a processor that generates information regarding a specific uplink transmission subframe of a cell group (CG), the information being used by a terminal to determine an allocation of maximum transmission power of each CG for the specific uplink transmission subframe of the CG indicated by the information and to determine another allocation of maximum transmission power of each CG for other than the specific uplink transmission subframe; and
    a transmitter that transmits the information to the terminal,
    wherein each CG uses a different Radio Access Technology.

4. A system comprising a base station and a terminal, wherein:
    the base station comprises:
        a first processor that generates information regarding a specific uplink transmission subframe of a cell group (CG), the information being used by the terminal to determine an allocation of maximum transmission power of each CG for the specific uplink transmission subframe of the CG indicated by the information and to determine another allocation of maximum transmission power of each CG for other than the specific uplink transmission subframe;
        a transmitter that transmits the information to the terminal; and
    the terminal comprises:
        a receiver that receives the information; and
        a second processor that determines the allocation of the maximum transmission power of each CG for the specific uplink transmission subframe of the CG indicated by the information and determines the another allocation of the maximum transmission power of each CG for other than the specific uplink transmission subframe, and wherein each CG uses a different Radio Access Technology.

\* \* \* \* \*